| R | SWITCHES OF FIG. 1 WHICH ARE TO BE CLOSED |
|---|---|
| 2 | NONE |
| 3 | $SW_0$, $SW_1$ |
| 4 | $SW_1$, $SW_2$ |
| 5 | $SW_0$, $SW_3$ |
| 6 | $SW_2$, $SW_4$ |
| 7 | $SW_4$, $SW_5$ |
| 8 | $SW_5$, $SW_6$ |
| 9 | $SW_3$, $SW_4$, $SW_5$, $SW_7$ |
| 10 | $SW_4$, $SW_8$ |
| 11 | $SW_6$, $SW_9$ |
| 12 | $SW_8$, $SW_{10}$ |
| 13 | $SW_5$, $SW_7$, $SW_{10}$, $SW_{11}$ |
| 14 | $SW_8$, $SW_9$, $SW_{11}$, $SW_{12}$ |
| 15 | $SW_8$, $SW_{13}$ |
| 16 | $SW_{13}$, $SW_{14}$ |
| 17 | $SW_{10}$, $SW_{12}$, $SW_{14}$, $SW_{15}$ |
| 18 | $SW_{13}$, $SW_{16}$ |
| 19 | $SW_{17}$, $SW_{19}$ |
| 20 | $SW_{13}$, $SW_{16}$, $SW_{17}$, $SW_{18}$ |

INVENTOR
F. M. GOETZ
BY Lucian C. Canepa
ATTORNEY

SHIFT REGISTER SEQUENCES
| E | s = [[log₂(E+1)]] | R = (s+1) | r = (E+s) | DIGIT ORDER 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|---|
| 1 | 1 | 2 | 2 | 0 | 1 | | | | | | | | | | | | | | | | | |
| 2 | 2 | 3 | 4 | 0 | 0 | 1 | 1 | | | | | | | | | | | | | | | |
| 3 | 2 | 3 | 5 | 0 | 0 | 1 | 1 | 0 | | | | | | | | | | | | | | |
| 4 | 3 | 4 | 7 | 0 | 0 | 0 | 1 | 0 | 1 | 1 | | | | | | | | | | | | |
| 5 | 3 | 4 | 8 | 0 | 0 | 0 | 1 | 0 | 1 | 1 | 1 | | | | | | | | | | | |
| 6 | 3 | 4 | 9 | 0 | 0 | 0 | 1 | 0 | 1 | 1 | 1 | 0 | | | | | | | | | | |
| 7 | 3 | 4 | 10 | 0 | 0 | 0 | 0 | 0 | 1 | 1 | 1 | 0 | 0 | | | | | | | | | |
| 8 | 4 | 5 | 12 | 0 | 0 | 0 | 0 | 1 | 1 | 1 | 1 | 0 | 1 | 0 | 1 | | | | | | | |
| 9 | 4 | 5 | 13 | 0 | 0 | 0 | 0 | 1 | 1 | 1 | 1 | 0 | 1 | 0 | 1 | 1 | | | | | | |
| 10 | 4 | 5 | 14 | 0 | 0 | 0 | 0 | 1 | 1 | 1 | 1 | 0 | 1 | 0 | 1 | 1 | 0 | | | | | |
| 11 | 4 | 5 | 15 | 0 | 0 | 0 | 0 | 1 | 1 | 1 | 1 | 0 | 1 | 0 | 1 | 1 | 0 | 0 | | | | |
| 12 | 4 | 5 | 16 | 0 | 0 | 0 | 0 | 1 | 1 | 1 | 1 | 0 | 1 | 0 | 1 | 1 | 0 | 0 | 1 | | | |
| 13 | 4 | 5 | 17 | 0 | 0 | 0 | 0 | 1 | 1 | 1 | 1 | 0 | 1 | 0 | 1 | 1 | 0 | 0 | 1 | 0 | | |
| 14 | 4 | 5 | 18 | 0 | 0 | 0 | 0 | 1 | 1 | 1 | 1 | 0 | 1 | 0 | 1 | 1 | 0 | 0 | 1 | 0 | 0 | |
| 15 | 4 | 5 | 19 | 0 | 0 | 0 | 0 | 1 | 1 | 1 | 1 | 0 | 1 | 0 | 1 | 1 | 0 | 0 | 1 | 0 | 0 | 0 |
FIG. 3
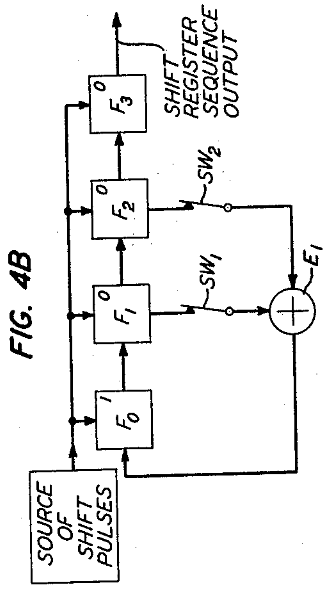
FIG. 4B
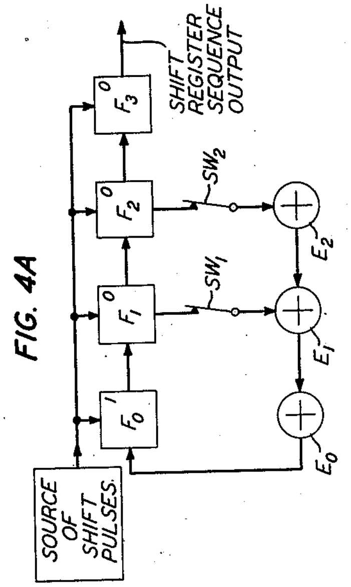
FIG. 4A
INVENTOR.
F. M. GOETZ
BY Lucian C. Canepa
ATTORNEY Nov. 3, 1964 F. M. GOETZ 3,155,818

ERROR-CORRECTING SYSTEMS

Filed May 15, 1961 9 Sheets-Sheet 3

SYNCHRONIZATION DIGITS ($X_1$–$X_{30}$)

INFORMATION DIGITS ($X_1$–$X_{20}$)

PARITY CHECK DIGITS ($X_{21}$–$X_{30}$)

| | | |
|---|---|---|
| $X_1$ | 0 | 1 |
| $X_2$ | 0 | 1 |
| $X_3$ | 0 | 1 |
| $X_4$ | 1 | 1 |
| $X_5$ | 0 | 1 |
| $X_6$ | 0 | 1 |
| $X_7$ | 0 | 1 |
| $X_8$ | 1 | 1 |
| $X_9$ | 0 | 1 |
| $X_{10}$ | 0 | 1 |
| $X_{11}$ | 0 | 1 |
| $X_{12}$ | 1 | 1 |
| $X_{13}$ | 0 | 1 |
| $X_{14}$ | 0 | 1 |
| $X_{15}$ | 0 | 1 |
| $X_{16}$ | 1 | 1 |
| $X_{17}$ | 0 | 1 |
| $X_{18}$ | 0 | 1 |
| $X_{19}$ | 0 | 1 |
| $X_{20}$ | 1 | 1 |
| $X_{21}$ | 0 | 1 |
| $X_{22}$ | 0 | 1 |
| $X_{23}$ | 0 | 1 |
| $X_{24}$ | 0 | 1 |
| $X_{25}$ | 0 | 1 |
| $X_{26}$ | 1 | 1 |
| $X_{27}$ | 1 | 1 |
| $X_{28}$ | 0 | 1 |
| $X_{29}$ | 0 | 1 |
| $X_{30}$ | 0 | 1 |

$N = n + r = 20 + 10 = 30$

INVENTOR.
F. M. GOETZ
BY Lucian C. Canepa
ATTORNEY

INVENTOR
F. M. GOETZ
BY Lucian C. Canepa
ATTORNEY

INVENTOR
F. M. GOETZ
BY Lucian C. Canepa
ATTORNEY

Nov. 3, 1964 F. M. GOETZ 3,155,818

ERROR-CORRECTING SYSTEMS

Filed May 15, 1961 9 Sheets-Sheet 6

FIG. 9

| ROW | STAGE F1 | F2 | F3 | F4 | F5 | F6 | F7 | F8 | F9 | F10 | F11 | F12 | F13 | F14 | F15 |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 2 | 1 $X_{26}$ | 0 $X_{25}$ | 0 $X_{24}$ | 0 $X_{23}$ | 0 $X_{22}$ | 0 $X_{21}$ | 1 $X_{20}$ | 0 $X_{19}$ | 0 $X_{18}$ | 0 $X_{17}$ | 1 $X_{16}$ | 0 $X_{15}$ | 0 $X_{14}$ | 0 $X_{13}$ | 1 $X_{12}$ |
| 3 | 0 $X_{30}$ | 0 $X_{29}$ | 0 $X_{28}$ | 1 $X_{27}$ | 1 $X_{26}$ | 0 $X_{25}$ | 0 $X_{24}$ | 0 $X_{23}$ | 0 $X_{22}$ | 0 $X_{21}$ | 1 $X_{20}$ | 0 $X_{19}$ | 0 $X_{18}$ | 0 $X_{17}$ | 1 $X_{16}$ |
| 4 | 0 $X_{28}$ | 1 $X_{27}$ | 1 $X_{26}$ | 0 $X_{25}$ | 0 $X_{24}$ | 0 $X_{23}$ | 0 $X_{22}$ | 0 $X_{21}$ | 1 $X_{20}$ | 0 $X_{19}$ | 0 $X_{18}$ | 0 $X_{17}$ | 1 $X_{16}$ | 0 $X_{15}$ | 0 $X_{14}$ |
| 5 | 1 $X_{27}$ | 1 $X_{26}$ | 0 $X_{25}$ | 0 $X_{24}$ | 0 $X_{23}$ | 0 $X_{22}$ | 0 $X_{21}$ | 1 $X_{20}$ | 0 $X_{19}$ | 0 $X_{18}$ | 0 $X_{17}$ | 1 $X_{16}$ | 0 $X_{15}$ | 0 $X_{14}$ | 0 $X_{13}$ |
| 6 | 1 $X_{26}$ | 0 $X_{25}$ | 0 $X_{24}$ | 0 $X_{23}$ | 0 $X_{22}$ | 0 $X_{21}$ | 1 $X_{20}$ | 0 $X_{19}$ | 0 $X_{18}$ | 0 $X_{17}$ | 1 $X_{16}$ | 0 $X_{15}$ | 0 $X_{14}$ | 0 $X_{13}$ | 1 $X_{12}$ |
| 7 | 0 $X_{25}$ | 0 $X_{24}$ | 0 $X_{23}$ | 0 $X_{22}$ | 0 $X_{21}$ | 1 $X_{20}$ | 0 $X_{19}$ | 0 $X_{18}$ | 0 $X_{17}$ | 1 $X_{16}$ | 0 $X_{15}$ | 0 $X_{14}$ | 0 $X_{13}$ | 1 $X_{12}$ | 0 $X_{11}$ |
| 8 | 0 $X_{24}$ | 0 $X_{23}$ | 0 $X_{22}$ | 0 $X_{21}$ | 1 $X_{20}$ | 0 $X_{19}$ | 0 $X_{18}$ | 0 $X_{17}$ | 1 $X_{16}$ | 0 $X_{15}$ | 0 $X_{14}$ | 0 $X_{13}$ | 1 $X_{12}$ | 0 $X_{11}$ | 0 $X_{10}$ |
| 9 | 0 $X_{23}$ | 0 $X_{22}$ | 0 $X_{21}$ | 1 $X_{20}$ | 0 $X_{19}$ | 0 $X_{18}$ | 0 $X_{17}$ | 1 $X_{16}$ | 0 $X_{15}$ | 0 $X_{14}$ | 0 $X_{13}$ | 1 $X_{12}$ | 0 $X_{11}$ | 0 $X_{10}$ | 0 $X_{9}$ |
| 10 | 0 $X_{22}$ | 0 $X_{21}$ | 1 $X_{20}$ | 0 $X_{19}$ | 0 $X_{18}$ | 0 $X_{17}$ | 1 $X_{16}$ | 0 $X_{15}$ | 0 $X_{14}$ | 0 $X_{13}$ | 1 $X_{12}$ | 0 $X_{11}$ | 0 $X_{10}$ | 0 $X_{9}$ | 1 $X_{8}$ |
| 11 | 0 $X_{21}$ | 1 $X_{20}$ | 0 $X_{19}$ | 0 $X_{18}$ | 0 $X_{17}$ | 1 $X_{16}$ | 0 $X_{15}$ | 0 $X_{14}$ | 0 $X_{13}$ | 1 $X_{12}$ | 0 $X_{11}$ | 0 $X_{10}$ | 0 $X_{9}$ | 1 $X_{8}$ | 0 $X_{7}$ |
| 12 | 1 $X_{20}$ | 0 $X_{19}$ | 0 $X_{18}$ | 0 $X_{17}$ | 1 $X_{16}$ | 0 $X_{15}$ | 0 $X_{14}$ | 0 $X_{13}$ | 1 $X_{12}$ | 0 $X_{11}$ | 0 $X_{10}$ | 0 $X_{9}$ | 1 $X_{8}$ | 0 $X_{7}$ | 0 $X_{6}$ |
| 13 | 0 | 0 | 0 | 0 | 0 | 0 | 0 | 0 | 0 | 0 | 0 | 0 | 0 | 0 | 0 |

| ROW | STAGE F16 | F17 | F18 | F19 | F20 | F21 | F22 | F23 | F24 | F25 | F26 | F27 | F28 | F29 | F30 |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 2 | 0 $X_{11}$ | 0 $X_{10}$ | 0 $X_{9}$ | 1 $X_{8}$ | 0 $X_{7}$ | 0 $X_{6}$ | 0 $X_{5}$ | 1 $X_{4}$ | 0 | 0 | 0 | 1 | 0 | 0 | 0 |
| 3 | 0 $X_{15}$ | 0 $X_{14}$ | 0 $X_{13}$ | 1 $X_{12}$ | 0 $X_{11}$ | 0 $X_{10}$ | 0 $X_{9}$ | 1 $X_{8}$ | 0 $X_{7}$ | 0 $X_{6}$ | 0 $X_{5}$ | 1 $X_{4}$ | 0 | 0 | 0 |
| 4 | 0 $X_{13}$ | 1 $X_{12}$ | 0 $X_{11}$ | 0 $X_{10}$ | 0 $X_{9}$ | 1 $X_{8}$ | 0 $X_{7}$ | 0 $X_{6}$ | 0 $X_{5}$ | 1 $X_{4}$ | 0 | 0 | 0 | 0 | 0 |
| 5 | 1 $X_{12}$ | 0 $X_{11}$ | 0 $X_{10}$ | 0 $X_{9}$ | 1 $X_{8}$ | 0 $X_{7}$ | 0 $X_{6}$ | 1 $X_8+X_{28}$ | 0 | 0 | 0 | 0 | 0 | 0 | 0 |
| 6 | 0 $X_{11}$ | 0 $X_{10}$ | 0 $X_{9}$ | 1 $X_{8}$ | 0 $X_{7}$ | 0 $X_{6}$ | 1 $X_8+X_{28}$ | 1 $X_7+X_{27}$ | 0 | 0 | 0 | 0 | 0 | 0 | 0 |
| 7 | 0 $X_{10}$ | 0 $X_{9}$ | 1 $X_{8}$ | 0 $X_{7}$ | 0 $X_{6}$ | 1 $X_8+X_{28}$ | 1 $X_7+X_{27}$ | 1 $X_6+X_{26}$ | 0 | 0 | 0 | 0 | 0 | 0 | 0 |
| 8 | 0 $X_{9}$ | 1 $X_{8}$ | 0 $X_{7}$ | 0 $X_{6}$ | 0 $X_{5}$ | 1 $X_7+X_{27}$ | 1 $X_6+X_{26}$ | 0 $X_5+X_{25}$ | 0 | 0 | 0 | 0 | 0 | 0 | 0 |
| 9 | 1 $X_{8}$ | 0 $X_{7}$ | 0 $X_{6}$ | 0 $X_{5}$ | 1 $X_{4}$ | 1 $X_6+X_{26}$ | 0 $X_5+X_{25}$ | 1 $X_4+X_{24}$ | 0 | 0 | 0 | 0 | 0 | 0 | 0 |
| 10 | 0 $X_{7}$ | 0 $X_{6}$ | 0 $X_{5}$ | 1 $X_{4}$ | 0 $X_{3}$ | 0 $X_5+X_{25}$ | 1 $X_4+X_{24}$ | 0 $X_3+X_{23}$ | 0 | 0 | 0 | 0 | 0 | 0 | 0 |
| 11 | 0 $X_{6}$ | 0 $X_{5}$ | 1 $X_{4}$ | 0 $X_{3}$ | 0 $X_{2}$ | 1 $X_4+X_{24}$ | 0 $X_3+X_{23}$ | 0 $X_2+X_{22}$ | 0 | 0 | 0 | 0 | 0 | 0 | 0 |
| 12 | 0 $X_{5}$ | 1 $X_{4}$ | 0 $X_{3}$ | 0 $X_{2}$ | 0 $X_{1}$ | 0 | 0 | 1 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 |

INVENTOR
F. M. GOETZ

BY Lucian C. Canepa

ATTORNEY

FIG. 10

| ROW | EXTREME LEFT HAND STAGE OF REGISTER 801 | | | | | | | | | EXTREME RIGHT HAND STAGE OF REGISTER 801 |
|---|---|---|---|---|---|---|---|---|---|---|
| 1 | 0 | 0 | 0 | 0 | 0 | 0 | 0 | 0 | 0 | 0 |
| 2 | 1 | 1 | 1 | 0 | 0 | 0 | 0 | 0 | 0 | 0 |
| 3 | 1 | 1 | 1 | 1 | 1 | 0 | 0 | 0 | 0 | 0 |
| 4 | 1 | 1 | 1 | 0 | 0 | 0 | 0 | 0 | 0 | 0 |

FIG. 11

| ROW | SUBSEQUENCE | | | CONTENTS OF F1 THROUGH F20 OF REGISTER 800 | | | | | | | REVERSE SHIFTS REQUIRED |
|---|---|---|---|---|---|---|---|---|---|---|---|
| | F21 | F22 | F23 | F1 | F2 | F3 | ------- | F18 | F19 | F20 | |
| 1 | 0 | 0 | 0 | $X_{20}$ | $X_{19}$ | $X_{18}$ | ------- | $X_3$ | $X_2$ | $X_1$ | 0 |
| 2 | 1 | 0 | 0 | $X_{21}$ | $X_{20}$ | $X_{19}$ | ------- | $X_4$ | $X_3$ | $X_2$ | 1 |
| 3 | 0 | 1 | 0 | $X_{22}$ | $X_{21}$ | $X_{20}$ | ------- | $X_5$ | $X_4$ | $X_3$ | 2 |
| 4 | 1 | 0 | 1 | $X_{23}$ | $X_{22}$ | $X_{21}$ | ------- | $X_6$ | $X_5$ | $X_4$ | 3 |
| 5 | 1 | 1 | 0 | $X_{24}$ | $X_{23}$ | $X_{22}$ | ------- | $X_7$ | $X_6$ | $X_5$ | 4 |
| 6 | EXAMPLE DESCRIBED IN SPECIFICATION 1 | 1 | 1 | $X_{25}$ | $X_{24}$ | $X_{23}$ | ------- | $X_8$ | $X_7$ | $X_6$ | 5 |
| 7 | 0 | 1 | 1 | $X_{26}$ | $X_{25}$ | $X_{24}$ | ------- | $X_9$ | $X_8$ | $X_7$ | 6 |
| 8 | 0 | 0 | 1 | $X_{27}$ | $X_{26}$ | $X_{25}$ | ------- | $X_{10}$ | $X_9$ | $X_8$ | 7 |

INVENTOR.
F. M. GOETZ
BY Lucian C. Canepa
ATTORNEY

INVENTOR.
F. M. GOETZ

BY Lucian C. Canepa

ATTORNEY

Nov. 3, 1964 F. M. GOETZ 3,155,818

ERROR-CORRECTING SYSTEMS

Filed May 15, 1961 9 Sheets-Sheet 9

INVENTOR
F. M. GOETZ
BY Lucian C. Canepa
ATTORNEY

United States Patent Office 3,155,818
Patented Nov. 3, 1964

3,155,818
ERROR-CORRECTING SYSTEMS

Frank M. Goetz, Franklin Square, N.Y., assignor to Bell Telephone Laboratories, Incorporated, New York, N.Y., a corporation of New York Filed May 15, 1961, Ser. No. 110,142
17 Claims. (Cl. 235—153)

This invention relates to digital information processing systems, and more particularly to the automatic correction of errors in such systems.

The problem of correctly transmitting binary signals over a noisy channel is a significant one whose solution has been actively sought. Some illustrative situations in which this problem arises are: when telephone lines subject to error impulses are being used to transmit data in binary form; when an imperfect medium such as magnetic tape or a photographic emulsion is used to store binary data; or when operations on binary signals are being carried out by means of circuits constructed of devices such as relays, diodes, or transistors, which have a probability of error.

In a typical information processing system, care must be taken to ensure that the transmitter and receiver thereof stay in synchronism. Without some synchronizing scheme the receiver might start decoding at the wrong instant and, as a result, emit only gibberish.

The occurrence of errors in a typical information processing system may arise from noise impulses which directly alter the digits of a transmitted word. Also, errors in such a system may arise from noise impulses which indirectly alter the correspondence between the encoded and decoded words by throwing the encoder and decoder out of synchronisum.

An object of the present invention is the improvement of the error-correcting capabilities of a digital information processing system.

More specifically, an object of this invention is an error-correcting system in which the number of redundant digits required to be added to an information word is relatively small in view of the error-correcting capabilities of the system.

Another object of the present invention is a reliable and easily implementable digital information processing system which is self-correcting with respect to various types of multiple errors.

These and other objects of the present invention are realized in an illustrative system embodiment thereof which comprises a source that supplies information words to an encoder, the encoder converting the information words into modified words containing sufficient redundancy to permit the words to be slightly mutilated by a noisy channel and still be correctly interpreted by a decoder. The modified words are sent via the noisy channel to the decoder, which reconstructs the original information words if the mutilation has not been excessive.

In the encoder of the illustrative system a group of $r$ parity check digits are suffixed to each group of $n$ digits which form an information word, the information digits being initially inserted into the stages of a main shift register. The check digits are formed by successively combining, in an EXCLUSIVE-OR circuit, the digits of a coding sequence with the information digits appearing in at least one of the stages of the main shift register. The coding sequence includes at least one "0" and one "1" and is generated by an auxiliary shift register whose output stage is connected to an input of the EXCLUSIVE-OR circuit. In this way both even and odd parity relationships are established between the information and check digits.

An encoded redundant information word is coupled in a serial mode from the terminal output stage of the main shift register to a transmission channel which is subject to error impulses. Synchronization digits, which occur in a predetermined time relationship with respect to the information digits, are also coupled to the channel.

The error-correcting capabilities of one specific system embodiment of the principles of the present invention encompass all so-called Class-1 errors, viz., all end-connected loss-bursts or gain-bursts, where the sum of the individual burst lengths is $\leqq E$. In this illustrative system the EXCLUSIVE-OR circuit included in the encoder receives as inputs thereto the coding sequence output of the auxiliary shift register and the information digits appearing in the terminal output stage of the main shift register.

In the decoder of the Class-1 error-correcting system a centered group of $n+r-E$ digits is obtained. Subsequently, $s$ parity checks are derived from the centered group, these parity checks forming a subsequence of the shift register coding sequence employed in the encoding process, the subsequence being positionable within the shift register sequence in only one way. In the process of locating the position of the subsequence within the sequence the decoding circuitry reconstructs all erroneously-received digits and re-establishes synchronization between the encoded and decoded information digits.

The error-correcting capabilities of a second specific system embodiment of the principles of the present invention encompass Class-1 errors and, in addition, all interior (i.e., not end-connected) loss-bursts of length $\leqq E$. In this second or Class-2 system the EXCLUSIVE-OR circuit included in the encoder receives as inputs thereto the coding sequence output of the auxiliary shift register and the output of another EXCLUSIVE-OR circuit whose inputs are information digits appearing in spaced stages of the main shift register.

The decoder of the Class-2 error-correcting system includes circuitry for recognizing whether an end-connected or an interior error burst occurred. If an end-connected error occurred, a decoder of the Class-1 type is employed to decode the received message. If, on the other hand, an interior error is detected, another type of arrangement is employed to perform the decoding operation. This decoding arrangement includes a main shift register through which information and check digits are shifted in such a manner that at each shift the new digit applied to the input end of the register is derived either from a delay line storing received information digits or, in the event that an interior digit error is detected, from a parity reconstruction circuit.

It is a feature of the present invention that a self-correcting information processing system include circuitry for establishing both even and odd parity relationships between the information and check digits of the system.

It is another feature of this invention that a self-correcting parity check system include encoding circuitry for suffixing a parity check group to an information word, the circuitry comprising an EXCLUSIVE-OR circuit whose successive pairs of inputs are the output of a coding sequence generator and a signal derived from at least one of the digits of the information word.

It is still another feature of the present invention that a self-correcting transmission system include decoding circuitry for detecting the nature of the mutilation of a transmitted redundant word and for reconstructing all erroneously-received information digits thereof.

A complete understanding of the present invention and of the above and other objects, features, and advantages thereof may be gained from a consideration of the following detailed description of two illustrative embodiments thereof presented hereinbelow in conjunction with the accompanying drawing, in which:

FIG. 3 is a tabular listing indicating in part the sequences that an arrangement of the type shown in FIG. 1 is capable of generating;

FIG. 4A is a particularized showing of a four-stage shift register sequence generator of the type shown in FIG. 1;

FIG. 4B is a simplified version of the generator of FIG. 4A;

FIG. 9 is a tabular listing of the various representations which are stored in the register 800 of FIG. 8 during the decoding operation;

Figure 8:
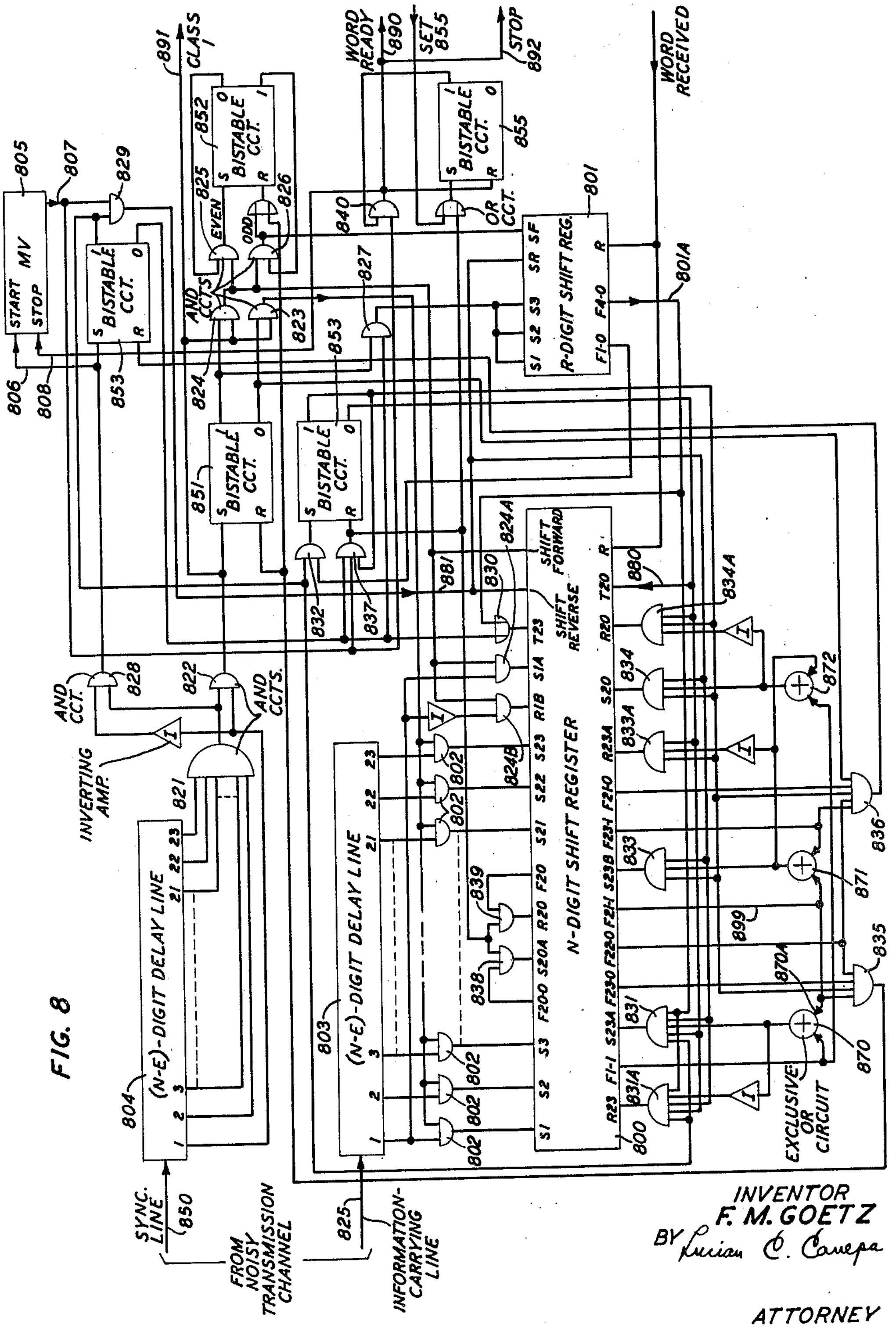
FIG. 8 shows the decoder of a specific illustrative Class-1 error-correcting system made in accordance with the principles of the present invention.
Figure 12:
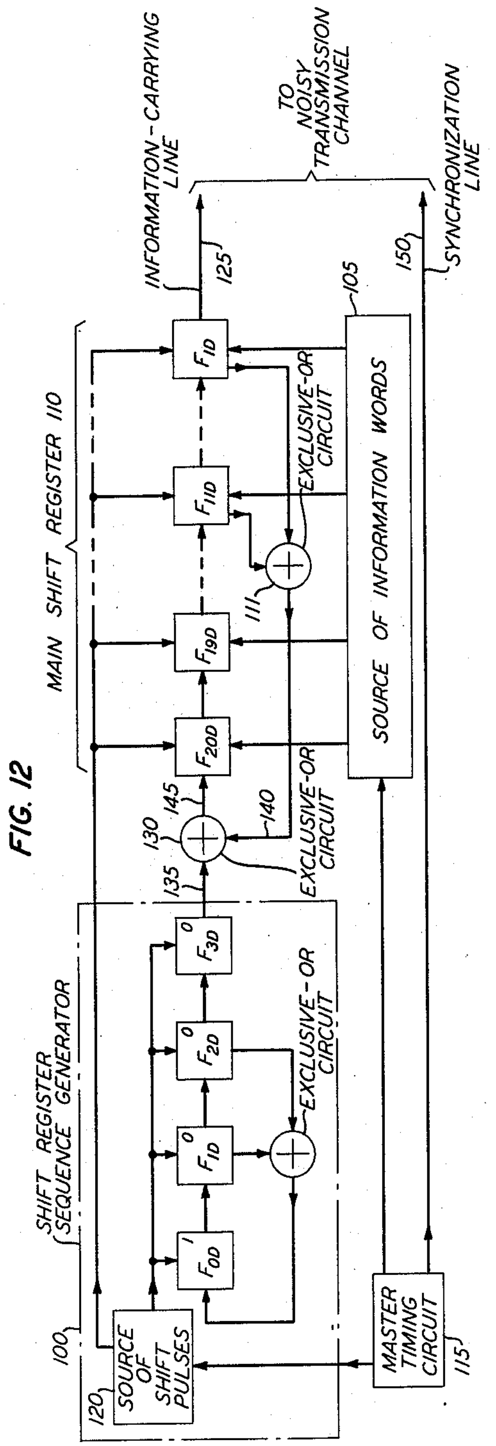
Figure 13B:
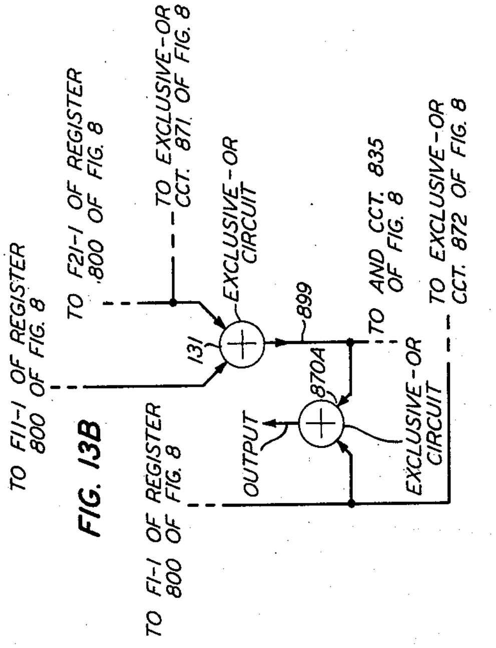
Figure 13A:
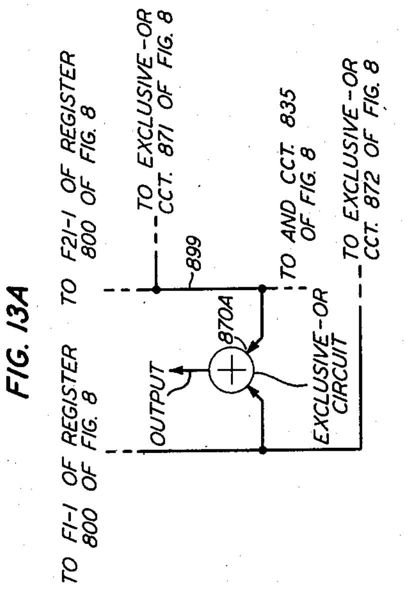
Figure 14:
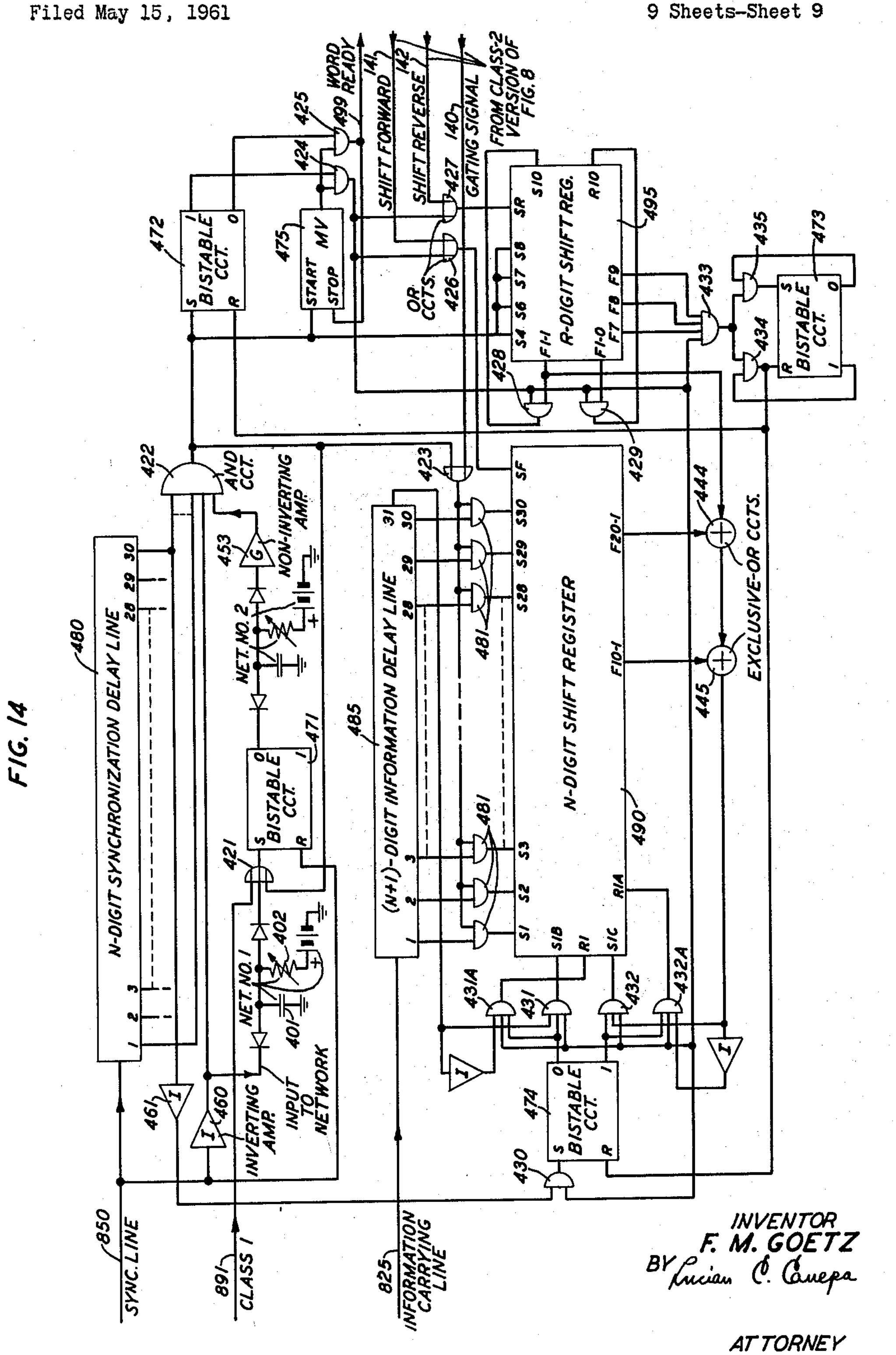

FIG. 10 lists various representations which are stored in the register 801 of FIG. 8 during the decoding operation;

FIG. 11 lists in part the various subsequences which are generated by the specific illustrative decoder shown in FIG. 8;

FIG. 12 depicts a specific Class-2 encoder made in accordance with the principles of the present invention;

FIGS. 13A and 13B depict for comparison purposes for Class-1 and Class-2 error-correcting systems, respectively, the configuration of a portion of the decoding circuitry thereof; and FIG. 14 shows one unit of a specific illustrative Class-2 decoder made in accordance with the principles of the present invention.

Before proceeding to a detailed description of specific illustrative embodiments of the principles of the present invention, there is presented hereinbelow certain general introductory and explanatory material of a background nature which is considered helpful to a complete and clear understanding of the invention. Following that material, two illustrative system embodiments of the principles of this invention are described in detail.

First, a few general words with respect to the type of overall system in which the herein-described inventive principles may be embodied and the type of multiple errors which embodiments of the present invention are capable of automatically correcting. The inventive concepts are illustratively presented herein in the context of a system in which an encoder and a decoder are interconnected by a channel for transmitting therebetween information and check digits and synchronization digits. In the simplest case, this can be accomplished by means of two separate transmission lines interconnecting the encoder and decoder. Herein these two lines will be respectively designated the information-carrying line and the synchronization line. Normally, the synchronization line carries a pulse or "1" signal in every digit position corresponding in time to the position in which a digit of the redundant word appears on the information-carrying line. Thus, for example, if some 30-digit word 10011 . . . 01, consisting of both information and check digits, appears on the information-carrying line in digit positions 1 through 30, there is propagated along the synchronization line during the same time interval a 30-digit word 11111 . . . 11, consisting only of "1" signals.

Class-1 errors are end-connected loss-bursts or gain-bursts, where the sum of the individual burst lengths is $\leq E$. For the assumed case of a 30-digit word, E would be 7 digits. Whenever the terms "lost" and "gained" are employed herein with respect to digits, it is to be understood that such reference is with respect to the digits of a synchronization word. It is to be noted, however, that impulses which cause errors to occur in the digits of a synchronization word may also cause errors to occur in corresponding information and check digits appearing on the information-carrying line. However, whether or not the corresponding digits on the information-carrying line are also affected, Class-1 errors would result in the encoded and decoded words not being exact replicas of each other, due to the loss of synchronization therebetween.

More specifically, Class-1 error bursts might, for example, cause the assumed 30-digit synchronization word to lose as many as 7 consecutive "1's" of its extreme left-hand digits, or as many as 7 consecutive "1's" of its extreme right-hand digits. Alternatively, by way of further example, 3 extreme left-hand "1's" and 4 extreme right-hand "1's" might be lost. Or, such noise bursts might, for example, cause as many as 7 consecutive "1's" to be prefixed or suffixed to the normal synchronization word, or might, illustratively, add 3 consecutive "1's" as a prefix and 4 consecutive "1's" as a suffix to the synchronization word.

Class-1 errors occur in those communication systems in which the beginnings and ends of binary sequences are susceptible to error. For example, in a system in which a sequence of pulses is transmitted through a filter, the first few pulses transmitted therethrough may, due to delay in the response characteristic of the filter, be of a lower amplitude than pulses occurring in the middle of the sequence. Similarly, energy storage effects in the filter may cause additional pulses to be added to the end of the desired sequence.

Class-2 errors include all Class-1 errors and, in addition, include interior loss-bursts of length $\leq E$. Again, for the assumed case of a 30-digit word, E would have the value 7. It is assumed herein that interior loss-bursts cause errors to occur both in the digits of a synchronization word and in the corresponding digits of the information word associted therewith.

For the sake of completeness, it is noted that my copending application Serial No. 110,143, filed concurrently herewith, is directed to a system capable of correcting so-called Class-3 errors, which include both Class-1 and Class-2 errors and, in addition, the type of error as a result of which the synchronization digits are unaffected but various ones of the information and check digits are changed in value.

In the systems described herein an encoded redundant word includes N binary digits, the first $n$ of which are information digits and the remaining $r$ of which are parity check digits. The number of check digits is determined by the relationship $$r=E+\log_2(E+1) \qquad (1)$$

and the values of the check digits are determined by a shift register sequence which establishes both even and odd parity relationships between the information and check digits.

It is noted that the concept of parity and its applicability to the field of error detection and correction is described in "Error Detecting and Error Correcting Codes," R. W. Hamming, The Bell System Technical Journal, Volume 29, 1950, pages 147–160.

The parameter E is employed herein to characterize the burst-correcting properties of the illustrative system embodiments of the principles of the present invention. The systems are self-correcting for error bursts of length $\leq E$ digits, where the burst length is the distance in digits between and including the first and last digits affected by a noise burst.

In these illustrative systems each transmitted redundant word must be followed by a blank interval of at least $E+1$ digit intervals, and the minimum word length N is $2E+1$. These systems are capable of correcting error bursts of the Class-1 and Class-2 type if adjacent error bursts are separated by at least $E+1$ blank intervals or N−E correctly-received digits.

An understanding of the type of binary signal sequence known as a shift register sequence is essential to an understanding of the principles of the illustrative embodiments described herein, for such sequences are intimately related to the encoding and decoding operations performed by these embodiments. Such a sequence is generated by an arrangement which includes a shift register. A shift register sequence $q=q_1, q_2 \ldots q_r$ of length $r$ and of characteristic $s$ is one in which all continuous subsequences of $s$ digits are distinct. For any $s$ there always exists such a sequence if $r$ satisfies the expression $$s \leq r \leq 2^s-1+s \qquad (2)$$

Figures 1, 2:
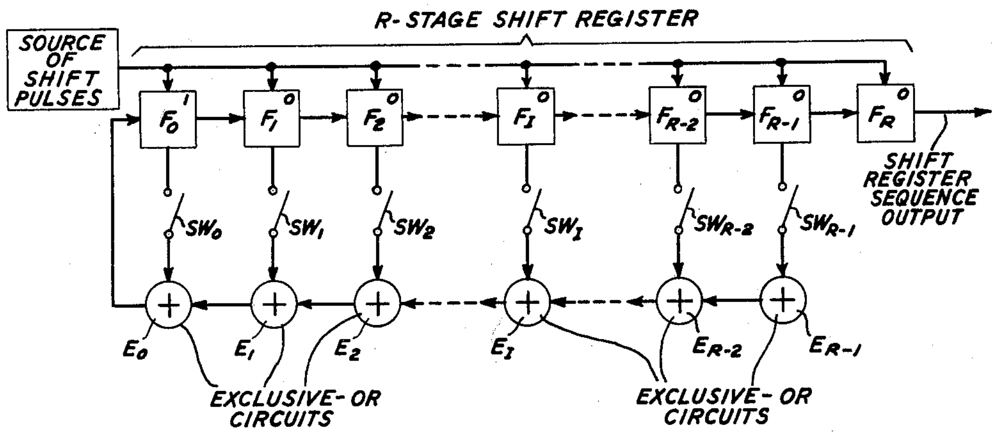
FIG. 1 is a generalized depiction of a shift register sequence generator of the type included in the encoders of illustrative embodiments of the principles of the present invention.
FIG. 2 is a tabular listing indicating which switches of the ones represented in FIG. 1 are to be closed as the number of stages of the shift register of FIG. 1 is varied from 2 through 20.

A circuit of the generalized form shown in FIG. 1 is employed to generate such shift register sequences.

$r$ and $s$ in expression (2) correspond respectively to the number of parity check digits to be added during the encoding process to a group of information digits and to the length of the subsequence by means of which error correction is effected during the decoding operation. The length of the subsequence $s$ is determined by the expression $$s=\log_2(E+1) \qquad (3)$$

FIG. 1 includes a plurality of bistable circuits, for example, flip-flops, designated $F_0, F_1, F_2 \ldots F_I \ldots F_{R-2}, F_{R-1}, F_R$, the initial representation of each of which is indicated by a "1" or a "0" in the upper right-hand corner of the block symbol thereof. Connected to each bistable circuit through a switch is an EXCLUSIVE-OR or modulo 2 adder circuit. It is noted that the terms "EXCLUSIVE-OR" and "modulo 2 adder" are functionally equivalent and are employed interchangeably herein.

To construct the encoder of a system having an error-correcting capability E, it is necessary to select a particular shift register sequence generator of the generalized form shown in FIG. 1. For a particular E the number R of bistable circuits to be included in the shift register is $s+1$, and the switches to be closed for R values of 2 through 20 are specified in tabular form in FIG. 2.

FIG. 3 lists in tabular form the shift register sequences which are generated by a circuit of the form shown in FIG. 1 for E values of 1 through 15. Each of these sequences is obtained by supplying $E+s$ shift pulses to the arrangement depicted in FIG. 1.

To specifically illustrate the procedure that would be followed in designing a shift register sequence generator, of the generalized form depicted in FIG. 1, for inclusion in a particular encoder embodying the principles of the present invention, assume that it is desired to transmit 20-digit information words via a noisy channel which is subject to end-connected or interior error bursts of length $\leq 7$ digits. In other terms, $n$ equals 20 and E equals 7. $r$, the number of partity check digits to be suffixed to each 20-digit information word, is found from expression (1) to be equal to 10. $s$ is determined from expression (3) to be equal to 3, and R, the number of bistable circuits to be included in the shift register sequence generator, is equal to $s+1$ or 4. For an R value of 4, FIG. 2 indicates that only $SW_1$ and $SW_2$ of the switches included in the arrangement of FIG. 1 are to be closed. The resulting shift register sequence generator is shown in FIG. 4A and in more simplified form in FIG. 4B, wherein the functionless one-input EXCLUSIVE-OR circuits $E_0$ and $E_2$ of FIG. 4A are omitted.

Figures 5, 6:
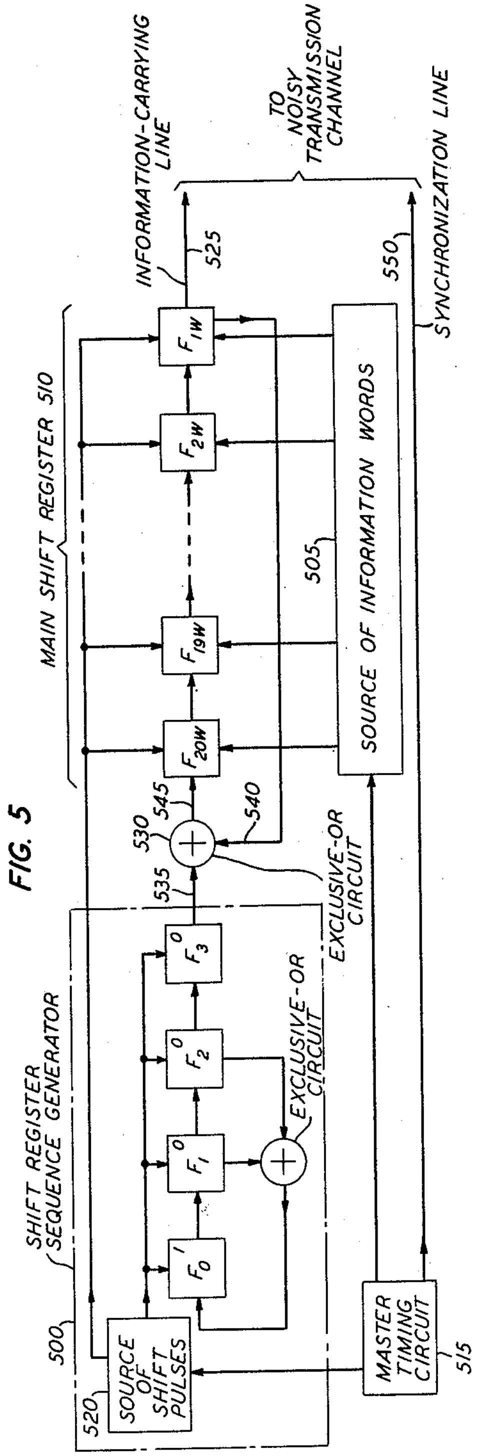
FIG. 5 depicts the encoder of a specific illustrative Class-1 error-correcting system embodying the principles of the present invention.
FIG. 6 shows a 30-digit synchronization word and, in addition, a specific illustrative 20-digit information word and the 10-digit parity check group which is generated and suffixed to the information word by the encoder depicted in FIG. 5.

Referring now to FIG. 5, there is shown the encoder of a specific Class-1 error-correcting system which illustratively embodies the principles of the present invention. The depicted encoder is designed to convert 20-digit information words into 30-digit redundant words for transmission over a noisy channel which is subject to end-connected error bursts of length $\leq 7$. Note that the encoder of FIG. 5 includes within the dashed line box thereof a shift register sequence generator 500 of the form described above and shown in FIG. 4B. The component circuits out of which the Class-1 encoder is formed are well known in the art and completely conventional, and are accordingly not depicted in detail in the drawing.

The illustrative Class-1 encoder shown in FIG. 5 includes a source 505 of information words which are to be coupled to a channel for transmission to a remote location. The source 505 is connected to the 20 bistable circuits $F_{1W}, F_{2W} \ldots F_{19W}, F_{20W}$ of a main shift register 510 and supplies information words thereto under the control of a master timing circuit 515.

The information digits stored in the main shift register 510 are shifted in a serial mode under control of a source 520 of shift pulses through the terminal output stage $F_{1W}$ of the register 510 to an information-carrying line 525. Additionally, the information digit stored in the terminal output stage $F_{1W}$ is coupled to one input of an EXCLUSIVE-OR circuit 530 whose other input is the shift register sequence output of the generator 500, the serial output sequence of the generator 500 also being controlled by the source 520. The modulo 2 sum of the inputs to the circuit 530 is applied to the last stage $F_{20W}$ of the register 510.

More specifically, during the 10-digit interval in which the first 10 digits of the information word are being shifted to the information-carrying line 525, the circuit 530 serially receives from the generator 500 via lead 535 a 10-digit sequence containing both "0's" and "1's" and serially receives from the terminal output stage $F_{1W}$ via lead 540 the first 10 digits of the information word. In this way the circuit 530 generates, during the noted 10-digit interval, 10 parity check digits which are serially coupled vial lead 545 to the stage $F_{20W}$ of the main shift register 510. The check digits are subsequently shifted through the register 510 under control of the source 520 and are applied to the information-carrying line 525 as a 10-digit suffix to the 20-digit information word.

During each of the 30 digit positions in which information and check digits are being transferred from the terminal output stage $F_{1W}$ of the main shift register 510 to the information-carrying line 525, the master timing circuit 515 couples a "1" signal to a synchronization line 550. Thus, in each 30-digit word period a redundant information word consisting of "0's" and "1's" appears on the information-carrying line 525 and a synchronization word consisting only of "1's" appears on the synchronization line 550. It takes 30 shift pulses to transfer a 30-digit redundant word to the information-carrying line 525. Encoding of the next information word can begin at any time after the last digit of the previous redundant word has been so transferred. Actual transfer of the first digit of the next word to the line 525 must not, however, begin until at least $E+1$ or 8 digit intervals elapse after the transfer to the line 525 of the last digit of the previous word.

If the shift register sequence generator of a Class-1 encoder generates a sequence $q=q_1, q_2 \ldots q_r$, any information word $x_1, x_2 \ldots x_n$ can be encoded in accordance with the principles of the present invention by satisfying the following equations:

$$x_i+x_{i+n}=q_i \text{ (modulo 2)}; \; i=1, 2 \ldots r \qquad (4)$$

For the specific Class-1 encoder illustrated in FIG. 5, $r$ equals 10, $n$ equals 20, and $q$ equals 0001011100.

Therefore, Equations 4 can be particularized as follows:

$$\begin{matrix} x_1+x_{21}=0 & x_6+x_{26}=1 \\ x_2+x_{22}=0 & x_7+x_{27}=1 \\ x_3+x_{23}=0 & x_8+x_{28}=1 \\ x_4+x_{24}=1 & x_9+x_{29}=0 \\ x_5+x_{25}=0 & x_{10}+x_{30}=0 \end{matrix} \quad (5)$$

Thus, if the first information digit $x_1$ has the value "1," the first equation of set (5) specifies that $x_{21}$ should also be "1." In other words, the first equation of set (5) specifies an even parity relationship between the information digit $x_1$ and the check digit $x_{21}$; that is, the number of "1's" in digit positions $x_1$ and $x_{21}$ is either zero or two. On the other hand, every expression of set (5) which is equal to "1" specifies an odd parity relationship between the information and check digits included in the expression.

The requirement of the first equation of set (5) is satisfied by the EXCLUSIVE-OR circuit 530 of FIG. 5, for if the input applied to the circuit 530 on the lead 535 is "0" (which is the first digit of the shift register sequence 0001011100) and the input applied thereto on the lead 540 is "1" (which is the signal appearing in position $x_1$), the output of the circuit 530 is a "1" signal. This "1" signal is the 21st digit of the encoded redundant word and is coupled to the stage $F_{20W}$ of the main shift register 510 after the first information digit of the redundant word has been shifted to the information-carrying line 525. In a similar manner, the circuit 530 generates the other check digits which appear in positions $x_{22}$ through $x_{30}$, imposing in each instance an even or an odd parity relationship between the check digit and its associated information digit depending, respectively, on whether the digit coupled from the generator 500 to the EXCLUSIVE-OR circuit 530 is a "0" or a "1."

In summary, the specific Class-1 encoder depicted in FIG. 5 modifies a 20-digit information word by suffixing thereto a 10-digit parity check group which is generated by an EXCLUSIVE-OR circuit each of whose successive pairs of inputs comprises a digit of a shift register sequence including both "0's" and "1's" and the information digit stored in the terminal output stage of a main shift register. The values of the check digits to be added to an information word can be determined from the equations of set (5). Thus, for example, it can be readily verified that the encoder of FIG. 5 modifies the 20-digit information word 10001000100010001000, wherein the extreme left-hand "1" appears in digit position $x_{20}$ and the extreme right-hand "0" appears in digit position $x_1$, by suffixing thereto the 10-digit check group 0001100000, wherein the extreme left hand "0" appears in digit position $x_{30}$ and the extreme right-hand "0" appears in digit position $x_{21}$, thereby providing a redundant information word of the form shown in FIG. 6. In FIG. 6 the digits appearing in the positions designated $x_1$ through $x_{20}$ are information digits, the digit in position $x_1$ being the first one thereof to be transferred to the information-carrying line, and the digits appearing in the positions designated $x_{21}$ through $x_{30}$ are the parity check digits of the redundant word.

It is significant to note that the novel encoding principles embodied in the specific Class-1 circuitry illustrated in FIG. 5 result in the circuitry being able to encode information words in a minimally redundant manner.

In a Class-1 error-correcting system, decoding is accomplished by circuitry which (1) counts the number $m$ of consecutively-received digits; (2) selects from the $m$-sequence a centered group of $N-E$ digits; (3) derives from the centered group a subsequence of $s$ parity check digits by means of which the relative position of the $N-E$ digits with respect to the encoded redundant word is indicated; and (4) reconstructs all mutilated digits that are within the error-correcting capabilities of the system.

A more analytical description of the decoding procedure carried out by a Class-1 decoder is helpful to a thorough understanding of the principles of the present invention. Such a description follows. Let $y_1, y_2 \ldots y_m$ represent a group of digits which is received from a noisy channel. The $N-E$ centered digits of the received group may be represented by the expression $$y_{a+1}, y_{a+2} \ldots y_{a+N-E} \quad (6)$$

Expression (6) contains no incorrect digits if $$a=\frac{E+m-N}{2} \quad (7)$$

Check digits $p_i$ can be derived from $$y_{a+i}+y_{a+i+n}=p_i; \; i=1, 2 \ldots s \quad (8)$$

The sequence $p_1, p_2 \ldots p_s$ is a subsequence of the shift register sequence $q_1, q_2 \ldots q_r$ and can be located within that sequence in only one way, for, as specified above in connection with the description of the Class-1 encoder, all continuous subsequences of $s$ digits in the shift register sequence $q_1, q_2 \ldots q_r$ are distinct. Let $$q_{j+1}, q_{j+2} \ldots q_{j+s}=p_1, p_2 \ldots p_s. \quad (9)$$

Then, the information digits involved in the checks from which $p_1, p_2 \ldots p_s$ are derived are, according to Equations 4, $$x_{j+1}, x_{j+2} \ldots x_{j+s} \quad (10)$$

where $0 \leq j \leq E$. Hence, expression (6) can be represented as $$x_{j+1}, x_{j+2} \ldots x_n, x_{n+1} \ldots x_{n+j}, x_{n+j+1} \ldots x_{n+j+s} \quad (11)$$

To calculate the values $x_1, x_2 \ldots x_j$, Equations 4 can be solved as follows:

$$x_i=q_i+x_{i+n}; \; i=1, 2 \ldots j \quad (12)$$

Then, because of the correspondence between expressions (6) and (11), the decoded information word can be represented as follows:

$$x_i=\begin{cases} q_i+y_{a+n-j+i}; & i=1, 2 \ldots j \\ y_{a-j+i}; & i=j+1, j+2 \ldots n \end{cases} \quad (13)$$

Next, an illustrative Class-1 decoder will be described in detail. Following that description, there will be demonstrated in specific terms the manner in which the illustrative decoder is capable of automatically reconstructing a mutilated redundant information word.

Figure 7A:
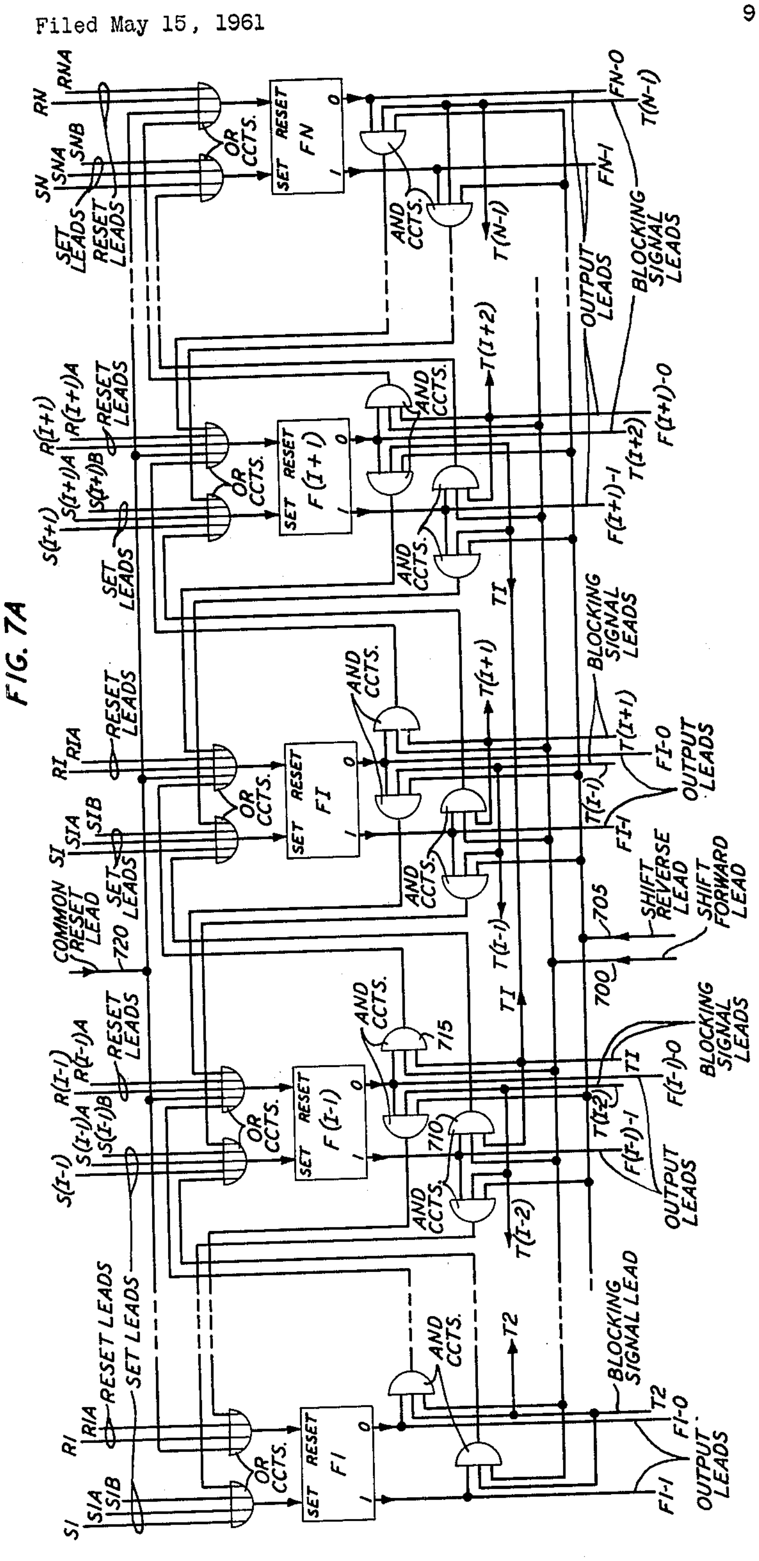
FIG. 7A is a generalized showing of a shift register circuit of the type included in illustrative Class-1 and Class-2 decoders embodying the principles of the present invention.
Figure 7B:
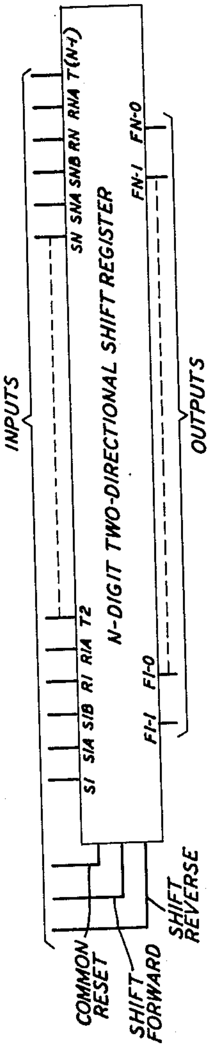
FIG. 7B is a symbolic depiction of the circuit of FIG. 7A.

With two exceptions, the component circuits out of which the Class-1 decoder are formed are well known in the art and completely conventional, and are accordingly not depicted in detail in the drawing. The exceptions are two two-directional shift registers, one of which is capable of storing R digits and the other of which stores N digits. FIG. 7A is a generalized depiction of this type of shift register circuit, and FIG. 7B is a symbolic depiction of the FIG. 7A circuit.

The N-digit two-directional shift register circuit shown in FIG. 7A includes N bistable circuits or stages F1 . . . F(I−1), FI, F(I+1) . . . FN, each of which includes set and reset input terminals and "1" and "0" output terminals. The N bistable circuits are interconnected by a pluralitty of AND and OR circuits which are arranged in such a manner that the application of a shift forward or "1" signal to lead 700 causes the digital representation of the register to be shifted one place to the right. For example, as a result of such a signal, the state of the bistable circuit F1 would be transferred to the next bistable circuit F2 of the register, the state of the bistable circuit F(I−1) would be transferred to the circuit FI, the state of the circuit FI would be transferred to the circuit F(I+1), and so forth, in a conventional manner characteristic of shift register circuits. Similarly, the application of a shift reverse or "1" signal to lead 705 causes the digital representation of the register to be shifted one place to the left.

In a decoder which includes a FIG. 7A type register it is sometimes necessary, in the process of shifting the representation of the register to the right or to the left, that a selected one of the stages receive its next-state information from an external source rather than from the stage adjacent thereto. This can be accomplished by applying a blocking signal to a selected one of the leads of the register of FIG. 7A. For example, assume that it is desired to shift the representation appearing in the register one place to the right, but that the next state of the bistable circuit FI is to be determined by an external source rather than by the present state of the adjacent stage F(I—1). The application of a blocking or "0" signal to the lead designated TI disables both of the AND circuits 710 and 715 and thereby prevents the output representations of stage F(I—1) from affecting the state of the stage FI, leaving control of the state of the stage FI to whatever signals are applied to the set and reset leads thereof. It is noted that each blocking signal lead normally has applied thereto a gating or "1" signal.

Each stage of the shift register circuit illustrated in FIG. 7A includes a plurality of set and reset leads. For example, the stage F1 includes set leads S1, S1A, S1B, a "1" signal on any one of these leads being effective to maintain or to switch the stage F1 to its "1" state. The "1" state of the stage F1 is represented by a "1" signal on its "1" output lead and a "0" signal on its "0" output lead. The stage F1 also includes reset leads, designated R1, R1A. The FIG. 7A circuit also includes a common reset lead 720 by means of a "1" signal on which every stage of the register circuit may be maintained at or switched to its "0" state.

The bistable circuits included in the shaft register shown in FIG. 7A are of a conventional type, in which the pulses applied thereto need be only of a relatively short duration, say, 0.3 microsecond, and in which the output indications of the circuits do not start to change until after the termination of the applied pulses. Thus, for the case of a 0.3 microsecond set signal applied to a circuit which is in its "0" state, the output indication of the circuit would not start to change to a "1" indication for, say, 0.5 microsecond.

Turning now to FIG. 8, there is shown a specific Class-1 decoder embodying the principles of the present invention, the illustrated decoder being one designed to decode 30-digit redundant words. The decoder includes two shift registers of the type shown in FIG. 7A, one shift register 800 including N or 30 bistable circuits and the other one 801 including R or 10 bistable circuits. Also, the illustrated decoder includes two N—E or 23 digit tapped delay lines, one, the information delay line 803, being connected to receive signals from the information-carrying line 825, and the other one, the synchronization delay line 804, being connected to receive signals from the synchronization line 850. The decoder also includes a plurality of AND, OR, INVERTING AMPLIFIER, EXCLUSIVE-OR, and bistable circuits connected as shown in FIG. 8. Additionally, the FIG. 8 decoder comprises a multivibrator 805 which after receiving a start pulse on lead 806 produces output clock pulses on lead 807 at the same repetition rate as that of the pulses on the lines 825 and 850, the first output of the multivibrator 805 occurring one digit period after the period in which the start pulse occurs. The output sequence on the lead 807 continues until a stop pulse is applied to the multivibrator 805 via lead 808.

Initially, assume that all the bistable circuits and registers of the FIG. 8 decoder are reset. Then, as a redundant word is received by the decoder from the noisy transmission channel, the synchronization pulses (one per digit position) are applied to the upper delay line 804 and the information pulses (one per "1" representation) are applied to the lower delay line 803. No other action takes place until 23 consecutive synchronization pulses are received by the line 804.

In response to the receipt from the channel of the 23rd consecutive synchronization pulse, bistable circuit 851 is set through AND circuits 821 and 822 and from that time on, as long as digits continue to arrive consecutively from the synchronization line 850, a signal appears at the output of the AND circuit 822. The 23rd consecutively-received synchronization pulse causes a signal to appear at the output of AND circuit 823. This signal gates all the "1's" appearing in the information delay line 803 through 23 two-input AND circuits 802 to the 30-digit shift register 800.

All incoming synchronization pulses subsequent to the 23rd one appear at the output of AND circuit 824. The first one of these subsequent pulses appears at the output of AND circuit 825A and sets bistable circuit 852 to its "1" state. The second one of these subsequent pulses appears at the output of AND circuit 826 and resets the bistable circuit 852. In this manner the 24th and all subsequent even-numbered synchronization pulses appear at the output of the AND circuit 825A, and the 25th and all subsequent odd-numbered synchronization pulses appear at the output of the AND circuit 826. All the pulses which appear at the output of the AND circuit 824 shift the 30-digit shift register 800 forward (i.e., to the right), while only the odd pulses (i.e., the pulses which appear at the output of the AND circuit 826) are effective to shift the 10-digit shift register 801 forward. Note that until such time as the absence of a synchronization pulse on the line 850 is detected, the first three left-hand bistable circuits of the 10-digit shift register 801 have applied thereto via AND circuit 827 constant set input pulses. Also, note that for each forward shift of the 30-digit shift register 800, the new value for the extreme left-hand bistable stage of the register 800 is derived from tap No. 1 of the information delay line 803 via AND circuit 824A.

The end of a consecutively-received sequence of synchronization pulses is indicated by the absence of a digit pulse at the output of tap No. 1 of the synchronization delay line 804 and by the simultaneous presence of pulses at taps Nos. 2 through 23 of the delay line 804. As a result of this condition, a pulse appears at the output of AND circuit 828. This pulse sets bistable circuit 853 and starts the multivibrator 805 which, as stated above, provides output clock pulses at the repetition rate characteristic of the pulses on the information-carrying and synchronization lines. These output pulses from the multivibrator 805 pass through AND circuit 829 and shift both of the registers 800 and 801 in their reverse directions.

No other action takes place in the decoder shown in FIG. 8 until the 10-digit register 801 has reverse-shifted to such a point that the fourth from the left bistable circuit thereof is reset. At this point the stages F1 through F10 of the register 801 respectively contain the digital representation 1110000000. This representation indicates that the desired sequence of $N—E$ or 23 digits is located in bistable circuits F1 through F23 of the 30-digit register 800. At this point in time, internal shifting is blocked at the bistable circuit F23 by a signal which is applied to terminal T23 of the register 800 via lead 801A and OR circuit 830, and the new value to be set into F23 for each of the next three shift pulses comes from the output of the EXCLUSIVE-OR circuit 870 via AND circuit 831. The inputs to the EXCLUSIVE-OR circuit 870 are signals representative of the states of the bistable circuits F1 and F21 of the shift register 800. As a result, the next three back shifts place a unique parity check subsequence in the stages F21, F22, and F23 of the register 800, thereby indicating the type of error present in the redundant word received from the noisy transmission channel.

Following these three shift pulses, each stage of the 10-digit register 801 is in its "0" state. This, in turn, results in (1) the setting of bistable circuit 853 through AND circuit 832, which primes the decoder for steps 2 through 5; (2) the deactivation of the AND circuit 831; (3) the activation of AND circuit 833, which allows the generated shift register sequence for parity correction to pass from EXCLUSIVE-OR circuit 871 to the stage F23 of the shift register 800; (4) the activation of AND circuit 834, which permits the generated information digit derived from EXCLUSIVE-OR circuit 872 to be set into the stage F20 of the register 800; and (5) the blocking of internal shifting to the stage F20 of the register 800 by a "0" signal on lead 820 to terminal T20 of the register 800.

Reverse-shifting of the 30-digit register 800 continues under the control of output clock pulses applied from the multivibrator 805 via lead 881 to the shift reverse terminal of the register 800, until a signal appears at the output of AND circuit 835, which occurs when the parity subsequence contained in the stages F21, F22, F23 of the register 800 is 1, 0, 0, respectively. This condition results in the resetting of the bistable circuits 851 and 852 via AND circuit 835 and indicates that one more shift of the 30-digit register 800 is required. After this shift, and as a result of the stages F21, F22, F23 respectively representing 0, 0, 1, a signal appears at the output of AND circuit 836, which resets the bistable circuit 853. The next output pulse from the multivibrator 805 passes through AND circuit 837 and (1) reverses the state of the stage F20 of the register 800 through AND circuits 838 and 839; (2) resets the bistable circuit 853; and (3) sets bistable circuit 855. The next and last pulse from the multivibrator 805 passes through AND circuit 840 and (1) resets the bistable circuit 855; (2) stops the multivibrator 805; and (3) signals associated circuitry (not shown) via word-ready lead 890 that a correct information word is stored in the stages F1 through F20 of the register 800. After the information word is gated out of the register 800, a word-received signal from a suitable source (not shown) resets the decoder circuit in preparation for the reception of a new word from the noisy transmission channel. Additional output signals, designated Class-1 and stop, appear on leads 891 and 892, respectively, and indicate the connections which may be made between the Class-1 decoder depicted in FIG. 8 and the Class-2 decoder shown in FIG. 14.

Now, to demonstrate in a particularly specific manner the error-correcting capabilities of the Class-1 decoder shown in FIG. 8, assume that the first three digits of the synchronization word represented in FIG. 6 are lost during transmission. Assume also, for the sake of the example, that the first three digits of the redundant information word are respectively changed in value from 0, 0, 0 to 1, 1, 1. These first three digits of each of the redundant and synchronization words occur in digit positions $x_1, x_2, x_3$.

In response to the appearance at the taps of the synchronization delay line 804 shown in FIG. 8 of the first 23 consecutive synchronization digits, specifically, the synchronization digits in positions $x_4$ through $x_{26}$, a signal is applied to the AND circuits 802 to gate the information digits in positions $x_4$ through $x_{26}$ from the information delay line 803 into the stages F1 through F23 of the shift register 800, the digit in position $x_4$ being placed in the stage F23, the digit in position $x_5$ being placed in the stage F22, et cetera, with the 23rd digit in position $x_{26}$ being placed in the stage F1. The condition of the register 800 is represented in rows 1 and 2 of FIG. 9, row No. 1 indicating the initial representation of the 30 stages of the register 800 and row No. 2 indicating their representation subsequent to the gating to the stages F1 through F23 of the digits in positions $x_4$ through $x_{26}$ of the received redundant word. Note that each of the information and check digits included in row No. 2 of FIG. 9 includes thereunder a digit position identifier.

FIG. 10 indicates the various representations which are stored in the 10-digit shift register 801 of FIG. 8 during the decoding operation of the herein-described Class-1 system. Row No. 1 of FIG. 10 depicts the initial representation of the 10-digit register 801, and row No. 2 indicates the representation which the register 801 assumes in response to the application to the synchronization delay line 804 of the 24th consecutive synchronization digit.

As the synchronization digits in excess of the first 23, viz., those appearing in positions $x_{27}$, $x_{28}$, $x_{29}$, $x_{30}$, continue to be applied to the synchronization delay line 804, four shift-forward pulses are applied to the shift register 800 via the AND circuit 824. Additionally, the synchronization digits appearing in position $x_{28}$ and $x_{30}$ cause the register 801 to be shifted forward two places. Row No. 3 of FIG. 9 indicates the resulting contents of the register 800, and row No. 3 of FIG. 10 indicates the resulting contents of the register 801.

As described in detail above, the detection by the delay line 804 of the end of a synchronization digit sequence causes a start signal to be applied to the multivibrator 805, whose output clock pulses cause both of the registers 800 and 801 to shift in a reverse direction until the register 801 contains the digital representation 1110000000, which is listed in row No. 4 of FIG. 10. It is clear that two shift-reverse pulses are required to convert the representation in row No. 3 to that in row No. 4 of FIG. 10.

The register 800 is also reverse-shifted two places, the resulting representation thereof being indicated in row No. 4 of FIG. 9, the digits stored in the stages F1 through F23 constituting a centered sequence of $N—E$ or 23 digits. For the specific example considered herein, the centered sequence comprises the 23 digits appearing in digit positions $x_6$ through $x_{28}$.

Reverse-shifting of the register 800 continues, and at each of the next three shifts the sum modulo 2 of the digits appearing in the stages F1 and F21 is inserted into the stage F23. The first such sum is the result of adding $x_{28}$ and $x_8$ and is indicated in row No. 5 of FIG. 9. The second such sum is the result of adding $x_{27}$ and $x_7$ and is listed in row No. 6 of FIG. 9, along with the other reverse-shifted contents of the register 800. Finally, the third such sum is the result of adding $x_{26}$ and $x_6$ and is indicated in row No. 7 of FIG. 9.

At this point an $s$- or 3-digit subsequence generated by the EXCLUSIVE-OR circuit 870 is stored in the stages F21, F22, F23 of the shift register 800 of the decoder shown in FIG. 8. This subsequence is uniquely positionable within the sequence 0001011100, which is the output sequence of the generator 500 of the encoder illustrated in FIG. 5.

In a Class-1 decoder of the specific type depicted in FIG. 8, the value of the 3-digit sequence stored in the stages F21, F22, F23 of the shift register 800 may assume any one of the eight values listed in FIG. 11. The contents of the stages F1 through F20 of the register 800 for each of the eight possible sequences are also indicated in FIG. 11. Furthermore, FIG. 11 lists for each possible 3-digit sequence the number of additional shift-reverse pulses which are required to shift the digits appearing in positions $x_1$ through $x_{20}$ into the stages F1 through F20.

For the specific example considered herein, the subsequence has the value 111 and the digits stored in the stages F1 through F20 of the register 800 are the digits which appear in positions $x_6$ through $x_{25}$ of the redundant word. Moreover, five additional reverse-shifts are required to place the digits appearing in positions $x_1$ through $x_{20}$ in the stages F1 through F20 of the register 800. These facts are represented in row No. 7 of FIG. 9 and row No. 6 of FIG. 11.

Reverse-shifting of the contents of the register 800 of FIG. 8 continues under the control of the multivibrator 805, the EXCLUSIVE-OR circuit 871 receiving as inputs thereto the digits stored in the stages F21, F22. The circuit 871 supplies an output "1" signal to the set terminal of the stage F23. Thus, as the register 800 is reverse-shifted, the circuit 871 sequentially generates the subsequences which respectively appear in rows 5. 4, 3, and 2 of FIG. 11, each of these subsequences appearing in succession in the stages F21, F22, F23 of the register 800. Row No. 8 of FIG. 9 depicts the contents of the register 800 after the first one of these additional reverse shifts, and rows 9, 10, 11, and 12 respectively depict the register contents after subsequent successive reverse shifts.

The output of the EXCLUSIVE-OR circuit 871 is also applied to one input terminal of the EXCLUSIVE-OR circuit 872, the other input to the circuit 872 being derived from the stage F1 of the register 800. The output of the circuit 872 is applied to the stage F20. In this way, the digital representation applied to the stage F20 is reconstructed from one digit of the redundant word and one digit of the unique subsequence. For example, looking at row No. 8 of FIG. 9, there is indicated the fact that one input to the EXCLUSIVE-OR circuit 872 is a signal representative of the state of the stage F23, viz., a "0" signal, which in turn was derived from the modulo 2 sum of $x_5$ and $x_{25}$. The other input to the circuit 872 is a signal representative of the former state of the stage F1, viz., a "0" signal representative of the digit in position $x_{25}$. Hence, by combining in an EXCLUSIVE-OR circuit the digits respectively representative of $x_5+x_{25}$ and $x_{25}$, the digit in position $x_5$ is reconstructed. As noted above, this reconstructed information digit is applied to the stage F20 of the register 800.

When the check subsequence stored in the stages F21, F22, F23 of the shift register 800 assumes the value 100 (which is represented in row No. 11 of FIG. 9), the register 800 is reverse-shifted once more, but the value of the digit inserted into the stage F20 of the register 800 is reversed in value. This modification in the normal pattern of generating the subsequences is required in view of the fact that the 000 subsequence listed in row No. 1 of FIG. 11 cannot be derived from a recurrence relationship. Subsequent to the reversal of the digit inserted into the stage F20, there is stored in the register 800 the representation listed in row No. 12 of FIG. 9. The digits stored in the stages F1 through F20 of the register 800 are the decoded information digits. These digits correspond exactly to the digits appearing in positions $x_1$ through $x_{20}$ of FIG. 6, despite the fact that the digits in positions $x_1$, $x_2$, $x_3$ were assumed to have been mutilated during transmission. Hence, the specific example considered herein has demonstrated the error-correcting capabilities of the illustrative Class-1 error-correcting system for one particular type of Class-1 error.

As stated previously hereinabove, Class-2 errors encompass all Class-1 or end-connected errors and, in addition, interior loss-bursts of length $\leq E$. An information word can be encoded for Class-2 error-correction by extending the Class-1 parity checking principles to include the requirement that every digit of the information word be included in the formulation of the parity check group to be suffixed to the information word. Since each parity check digit must be derived from the same number of variables, this requirement leads to the necessity for making the number $n$ of information digits a multiple $k$ of the number $r$ of digits included in a shift register sequence. Hence, for some integer $k$, $$n=kr \text{ or } N=(k+1)r \qquad (14)$$

It is noted that although $r$ is fixed for a given E, values $r=r+1$, $r+2$, et cetera, can be formed by using partial shift register sequences associated with larger values of E. However, in the interests of simplicity and clarity of presentation and because the satisfaction of Equation 14 results in a minimally redundant Class-2 encoder, it is assumed herein that Equations 14 hold. The encoder equations then become $$x_i+x_{i+r} \ldots x_{i+kr}=q_i;\ i=1, 2 \ldots r \qquad (15)$$

A specific illustrative Class-2 encoder for the particular case of $n$ equals 20 and E equals 7 is shown in FIG. 12. This encoder is identical in configuration and operation to the Class-1 encoder described above and depicted in FIG. 5 except for the fact that in the Class-2 encoder the parity check digit generation process involves the information digits stored in two spaced stages, viz., the first or terminal output stage and the 11th stage, of the main register of the encoder.

More specifically, the information digits appearing in the first and 11th stages $F_{1D}$ and $F_{11B}$, respectively, of the main shift register 110 of the Class-2 encoder of FIG. 12 are combined in an EXCLUSIVE-OR circuit 111, the output of the circuit 111 being applied to one of the input terminals of the check digit-generating EXCLUSIVE-OR circuit 130. In this way, every one of the 20 information digits, rather than as in the Class-1 case only the first 10 information digits, enters into the determination of the 10-digit parity check group which is suffixed to the information word. Except for this difference, the encoders of FIGS. 5 and 12 are identical.

A Class-2 decoder treats every received sequence which has a length of at least $N-E$ consecutive digits in a manner similar to that described above with respect to the decoding operation in a Class-1 system, the only difference therebetween being that in the Class-2 decoder the generation of a parity check subsequence is derived from one check digit and two, rather than only one, information digits. Accordingly, to analytically describe the decoding operation of a Class-2 system for Class-1 errors, the Class-1 Equations 8, 12 and 13 set forth above must be respectively changed to read as follows:

$$y_{a+i}+y_{a+i+r}+y_{a+i+2r} \ldots y_{a+i+kr}=p_i;\ i=1, 2 \ldots s \qquad (16)$$

$$x_i=q_i+x_{i+r}+x_{i+2r} \ldots x_{i+kr};\ i=1, 2 \ldots s \qquad (17)$$

$$x_i=\begin{cases} q_i+y_{a+r-j+i}+y_{a+2r-j+i} \ldots y_{a+kr-j+i}; & i=1 \ldots j \\ y_{a-j+i} & i=j+1 \ldots n \end{cases} \qquad (18)$$

The receipt by the decoder of a Class-2 error-correcting system of a redundant word which does not include a continuous sequence of at least $N-E$ digits indicates that the received word includes at least one interior lost digit at a distance greater than E digits from one end of the received sequence. Such an interior error can be corrected because (1) no shift in the received information word with respect to the synchronization word has taken place: (2) all spaces or lost digits $z_u$ in the received synchronization sequence can be detected; and (3) all information digits corresponding to the lost synchronization digits can be corrected, since each such information digit affects only one of the three components from which one of the parity checks was derived. For each space $z_u$ in the synchronization word, the correct value of the corresponding information digit $x_u$ can be determined from the following equations:

$$x_u=q_j+y_j+y_{j+r}+ \ldots +y_{i+(v-1)r}+y_{i+(v+1)r}+ \ldots +y_{i+kr}; \qquad (19)$$

where $$u=j+vr \text{ and } \begin{Bmatrix} 1 \leq j \leq r \\ 1 \leq v \leq k \end{Bmatrix}$$

The Class-2 decoder may be regarded as comprising two parallel-connected units, one having the capacity for correcting Class-1 errors and being a slightly modified version of the Class-1 decoder depicted in FIG. 8, and the other, shown in FIG. 14, having the capacity for correcting interior error bursts. Illustratively, the Class-1 error-correcting unit of the Class-2 decoder may take the form of the Class-1 decoder shown in FIG. 8. The only change that need be made in the FIG. 8 decoding arrangement is to break the lead 899 which interconnects the terminal F21-1 of the shift register 800 and the input terminal 870A of the EXCLUSIVE-OR circuit 870, and to insert therein another EXCLUSIVE-OR circuit. To be more specific and for purposes of a clear comparison, FIG. 13A shows the EXCLUSIVE-OR circuit 870 of FIG. 8 and indicates the connections made thereto in the decoder of a Class-1 error-correcting system, while FIG. 13B shows the circuit 870 and an additional EXCLUSIVE-OR circuit 131 and the connections made thereto in the Class-1 decoder unit of a Class-2 error-correcting system. With the modification specified in FIG. 13B, the FIG. 8 decoder is capable of automatically correcting for any Class-1 mutilation which occurs to an information word that is encoded in a Class-2 encoder.

The presence in a Class-2 system of an interior error burst of length $\leq E$ digits is indicated by the appearance of a signal at the output of AND circuit 422 of the specific decoder shown in FIG. 14. For such a signal to appear there, the following four conditions must be met: (1) there must be a "1" signal at tap No. 30 of synchronization delay line 480; (2) there must be a "1" signal at tap No. 1 of the line 480; (3) there must be no "1" signal on the synchronization line 850, which is indicated by a "1" signal at the output of inverting amplifier 460; and (4) bistable circuit 471 must have remained reset for at least 26 digit intervals, which is indicated by a "1" signal at the output of noninverting amplifier 453.

Condition No. 4 can be restated in terms of the input conditions of AND circuit 421, viz., neither detection of (1) a Class-1 error or (2) an interior error burst of length $\leq E$ digits nor (3) detection of a delay of at least 8.5 digit intervals between synchronization pulses (which is indicated by the inverting amplifier 460 and network No. 1) should have occurred for at least 26 digit intervals.

An understanding of condition No. 4 depends on an understanding of the mode of operation of networks 1 and 2 of FIG. 14. The networks operate as follows. When the input to a network is a "1" signal, the capacitor of the network is allowed to charge to a positive value, the charging time constant thereof being adjusted by an associated variable resistor, the adjustment of which is made such that at a specified time (8.5 digit intervals for network No. 1 and 26 digit intervals for network No. 2) the output voltage of the network reaches the threshold voltage of bistable circuit 471 or of the noninverting amplifier 453. This is the point at which the logical value of the signal on the output lead of the network changes from a "0" to a "1." In any digit interval in which the input lead of a network has a "0" signal applied thereto, there is provided a low impedance discharge path which reduces the voltage on the capacitor to zero. Charging of the capacitor starts anew after the input lead of the network assumes the value "1."

The number of digit intervals assigned to each of the networks shown in FIG. 14 is determined by the following factors. Network No. 1 is set for 8.5 digit intervals since 8 digit intervals is the longest time that could elapse between successive received synchronization pulses on a correctable Class-2 error, while 9 digit intervals is the shortest time that could elapse between two transmitted words. Network No. 2 is adjusted for 26 digit intervals as a center value between 23, the shortest duration, and 30, the longest elapsed time than can occur between the detection of the inter-word spacing (by network No. 1) and the detection of a Class-2 error word.

In response to the detection of an interior error, a "1" signal appears at the output of the AND circuit 422. This "1" signal does the following: (1) sets bistable circuit 472; (2) sets the bistable circuit 471; (3) gates the digits stored in information delay line 485 through 30 two-input AND circuits 481 into stages F1 through F30 of a 30-digit shift register 490; (4) starts multivibrator 475, which thereafter produces output clock pulses at the repetition rate of the digits received from the synchronization and information-carrying lines; and (5) sets stages F4, F6, F7, F8 in a 10-digit shift register 495. As a result, the stages F1 through F10 of the 10-digit shift register 495 contain, respectively, the digital representation 0001011100, which, it is noted, is exactly the parity shift register sequence supplied by the generator 100 of the Class-2 encoder shown in FIG. 12.

The decoding operation performed by the circuit arrangement shown in FIG. 14 involves 20 forward (i.e., to the right) shifts of the 30-digit register 490 and, in synchronism therewith, 20 reverse shifts of the 10-digit register 495, the new value of the stage F10 of the register 495 being derived from the stage F1 of the register 495 through AND circuits 428 and 429. Note that, as in the case of the register 801 of the Class-1 decoder illustrated in FIG. 8, the 10-digit shift register 495 also performs the function of counting the output clock pulses of the multivibrator 475. Specifically, every 10th output pulse from the multivibrator 475 appears at the output of AND circuit 433.

The multivibrator 475 supplies 20 output clock pulses which pass through AND circuit 424 and do the following: (1) reverse-shift the 10-digit register 495 via OR circuit 427; and (2) forward-shift the 30-digit register 490 through OR circuit 426, the new value inserted into the stage F1 of the register 490 being obtained from tap No. 31 of the information delay line 485, initially via AND circuits 431 and 431A. This shifting action continues until the first lost synchronization digit is detected by inverting amplifier 461 and AND circuit 430. The resulting "1" signal output of the AND circuit 430 sets bistable circuit 474. The shifting action of both registers continues as before, but now the new value inserted into the stage F1 of the register 490 is derived from EXCLUSIVE-OR circuit 445 via AND circuits 432 and 432A. The value so derived is the correct one for the information digit corresponding in position to the lost synchronization digit because the information digit is constructed in a manner identical to that employed in the encoding process, viz., from the shift register sequence (F1–1 of the 10-digit register 495) and from the EXCLUSIVE-OR circuits 444 and 445, which are serially connected to F10–1 and F20–1 of the 30-digit register 490.

In response to the 10th output pulse from the multivibrator 475, bistable circuit 473 is set through AND circuits 433 and 435. In response to the 20th multivibrator pulse, the bistable circuit 473 is reset through AND circuits 433 and 434, thereby causing the resetting of the bistable circuits 472 and 474. The next and last pulse from the multivibrator 475 appears at the output of AND circuit 425, thereby stopping the multivibrator and signaling to external circuitry by means of a word-ready signal on lead 499 that the corrected information word is available in the stages F1 through F20 of the shift register 490. When the corrected word has been received by the external circuitry, there is provided a pulse from a reset source (not shown) to reset the FIG. 14 decoder in preparation for the reception of another redundant word from the noisy transmission channel.

It is to be noted that a Class-2 decoder made in accordance with the principles of the present invention need not include the two completely separate and distinct decoding units described hereinabove. Instead, several of the circuit components of a Class-2 decoder are adaptable to decode either end-connected or interior error bursts, thus making possible a considerable reduction in the required amount of decoding circuitry. For example, two rather than four delay lines are sufficient to accomplish the Class-2 decoding operation. These two lines are: a single synchronization delay line characterized by a delay of 30 digit intervals and having thereon 30 equally-spaced taps, and a single information delay line characterized by a delay of 31 digit intervals and having 31 equally-spaced taps. Additionally, a single N-digit shift register and a single R-digit shift register can perform the functions of the four registers described above as being included in the two separate units of a Class-2 decoder.

In the case in which the N-digit and R-digit registers are shared by the two units of a Class-2 decoder, each of OR circuits 423, 426, 427 shown in FIG. 14 receives an input signal either from a unit of the FIG. 14 arrangement or via leads 140, 141, 142, respectively, from the modified FIG. 8 arrangement.

It is to be understood that the above-described arrangements are illustrative of the application of the principles of the invention. Numerous other arrangements may be devised by those skilled in the art without departing from the spirit and scope of the invention. For example, although emphasis herein has been directed to applying the principles of this invention to the correction of errors which occur on a transmission channel that interconnects spaced encoding and decoding units, it is to be understood that these principles are equally applicable to the correction of errors in information processing equipment which is positioned at a single location. Specifically, the principles of the present invention are to be understood to apply to the correction of errors which occur in the internal circuitry of such equipment.

What is claimed is:

1. In combination in a self-correcting binary information system which includes a transmission channel subject to error bursts, an encoder comprising means for supplying information digits, means for timing said supplying means and for providing synchronization digits, first shift register means responsive to the output of said supplying means for serially applying said information digits to said channel, means for generating check digits and for serially applying said check digits to said first shift register means for application to said channel, said generating means including second shift register means for providing a binary sequence which includes at least one "0" and one "1," said generating means also including modulo 2 adding means successively responsive to the output of said second shift register means and the information digit appearing in at least one stage of said first shift register means for generating said check digits and for serially applying them to said first shift register means, and means for coupling said synchronization digits to said channel; and a decoder comprising delay line means connected to said transmission channel for receiving therefrom said information and check digits and said synchronization digits, third shift register means connected to said delay line means for receiving therefrom said information and check digits, means for shifting said information and check digits through said third shift register means, and parity reconstruction circuit means connected to said third shift register means for regenerating erroneously-received information digits which are within the error-correcting capabilities of said system as said information and check digits are shifted through said third shift register means.

2. In combination in a self-correcting binary information system which includes a transmission channel subject to error bursts, an encoder comprising means for supplying information digits, means for timing said supplying means and for providing synchronization digits, first shift register means responsive to the output of said supplying means for serially applying said information digits to said channel, means for generating check digits and for serially applying said check digits to said first shift register means for application to said channel, said generating means including second shift register means for providing a binary sequence which includes at least one "0" and one "1," said generating means also including modulo 2 adding means successively responsive to the output of said second shift register means and the information digit appearing in the output stage of said first shift register means for generating said check digits and for serially applying them to said first shift register means, and means for coupling said synchronization digits to said channel; and a decoder comprising delay line means connected to said transmission channel for receiving therefrom said information and check digits and said synchronization digits, third shift register means connected to said delay line means for receiving therefrom said information and check digits, means for shifting said information and check digits through said third shift register means, means for deriving from said information digits in said third shift register means a subsequence of said encoder sequence, means responsive to the application thereto of said subsequence for re-establishing synchronization between the encoded and decoded information digits, and parity reconstruction circuit means for regenerating erroneously-received information digits which are within the error-correcting capabilities of said system.

3. In combination in a self-correcting binary information system which includes a transmission channel subject to error bursts, an encoder comprising means for supplying information digits, means for timing said supplying means and for providing synchronization digits, first shift register means responsive to the output of said supplying means for serially applying said information digits to said channel, means for generating check digits and for serially applying said check digits to said first shift register means for application to said channel, said generating means including second shift register means for providing a binary sequence which includes at least one "0" and one "1," said generating means also including modulo 2 adding means successively responsive to the output of said second shift register means and the information digits appearing in a plurality of spaced stages of said first shift register means for generating said check digits and for applying them to said first shift register means, and means for coupling said synchronization digits to said channel; and a decoder comprising delay line means connected to said transmission channel for receiving therefrom said information and check digits and said synchronization digits, third shift register means connected to said delay line means for receiving therefrom said information and check digits, means for shifting said information and check digits through said third shift register means, means for detecting the presence of an interior error burst in said received digits, and parity reconstruction circuit means responsive to the presence of an interior error burst for regenerating erroneously-received information digits which are within the error-correcting capabilities of said system as said information and check digits are shifted through said third shift register means.

4. In combination in a self-correcting binary system which includes a noisy transmission channel subject to error bursts, multistage means for storing an information word, said multistage storing means including a terminal output stage connected to said channel and further including an input stage, means for serially shifting the digits of said information word through said multistage means to said channel, means responsive to said shifting means and to the information successively stored in at least one of the stages of said multistage means for generating a parity check group whose digits respectively establish both even and odd parity relationships with respect to said information digits and for serially applying the digits of said group to the input stage of said multistage means, thereby to suffix said group to said word.

5. A combination as in claim 4 wherein said generating and applying means includes a first modulo 2 adder having an output terminal, and means interconnecting said output terminal and said input stage of said multistage storing means.

6. A combination as in claim 5 wherein said generating and applying means further includes means connected to one input terminal of said first modulo 2 adder for supplying thereto a shift register sequence which includes at least one "0" and one "1."

7. A combination as in claim 6 wherein said first modulo 2 adder includes another input terminal, and means interconnecting said other input terminal and at least one stage of said multistage storing means.

8. A combination as in claim 7 wherein said means interconnecting said other input terminal of said modulo 2 adder and at least one stage of said multistage storing means includes a direct electrical connection between said other input terminal of said first modulo 2 adder and the terminal output stage of said multistage storing means.

9. A combination as in claim 7 wherein said means interconnecting said other input terminal of said modulo 2 adder and at least one stage of said multistage storing means includes a second modulo 2 adder having two input terminals respectively connected to spaced stages including said terminal output stage of said multistage storing means, said second modulo 2 adder having an output terminal, and means connecting said output terminal of said second modulo 2 adder to the other input terminal of said first modulo 2 adder.

10. In combination in a system for redundantly encoding an information word by suffixing thereto a parity check group, multistage shift register means for storing an information word, means for generating an output sequence which includes at least one "0" and one "1," means connected to said shift register means and to said generating means for applying shift pulses thereto, and modulo 2 adding means responsive to the output of said generating means and to the state of at least one of the stages of said shift register means for generating a parity check group and for applying said group to the input stage of said shift register means.

11. In combination in a system for redundantly encoding an information word by suffixing thereto a parity check group, multistage shift register means for storing an information word, means for generating an output sequence which includes at least one "0" and one "1," means connected to said shift register means and to said generating means for applying shift pulses thereto, and modulo 2 adding means responsive to the output of said generating means and to the state of the output stage of said shift register means for generating a parity check group and for applying said group to the input stage of said shift register means.

12. In combination in a system for redundantly encoding an information word by suffixing thereto a parity check group, multistage shift register means for storing an information word, means for generating an output sequence which includes at least one "0" and one "1," means connected to said shift register means and to said generating means for applying shift pulses thereto, and modulo 2 adding means responsive to the output of said generating means and to the states of a plurality of spaced stages of said shift register means for generating a parity check group and for applying said group to the input stage of said shift register means.

13. A combination as in claim 12 wherein said modulo 2 adding means includes a first modulo 2 adder responsive to the states of a plurality of spaced stages including the terminal output stage of said shift register means, and a second modulo 2 adder responsive to the output of said first adder and to the output of said generating means for applying said parity check group to the input stage of said shift register means.

14. In combination in a decoding system which is connected to a noisy transmission channel for receiving therefrom an N-digit synchronization word and an N-digit redundant information word, first tapped delay line means for receiving from said channel the digits of a synchronization word, second tapped delay line means for receiving from said channel the digits of a redundant information word, N-stage shift register means, normally-disabled gating means respectively interconnecting the taps of said second delay line means and selected ones of the stages of said shift register means, means responsive to synchronization digit signals appearing at selected ones of the taps of said first delay line means for applying an enabling signal to said gating means to gate information digit signals appearing at the taps of said second delay line means to said shift register means, means for sequentially shifting the contents of said shift register means, and parity reconstruction circuit means connected to said shift register means for regenerating erroneously-received information digits which are within the error-correcting capabilities of said system as said information digit signals are shifted through said shift register means.

15. A combination as in claim 14 wherein each of said first and second tapped delay line means includes $N-E$ equally spaced taps, where E is the maximum number of digits which are affected by an error burst that is within the error-correcting capabilities of said decoding system, and wherein said enabling signal applying means responds only to the simultaneous occurrence of synchronization digit signals at every one of the $N-E$ taps of said first delay line means to gate the information digit signals appearing at the $N-E$ taps of said second delay line means to said shift register means.

16. A combination as in claim 15 wherein said shifting and reconstructing means includes modulo 2 adding means for generating a subsequence of the sequence in accordance with which said redundant information was originally formed and for deriving from said subsequence erroneously-received information digits.

17. In combination in a decoding system which is adapted to receive an N-digit word from a noisy transmission channel that is subject to end-connected and interior error bursts, means for receiving said word from said channel and for detecting whether said word was subjected to an end-connected or an interior error burst, said detecting means including first delay line means for receiving said word from said channel, said first delay line means being characterized by $N-E$ digit periods of delay and having thereon $N-E$ equally spaced taps, where E is the maximum number of digits which are affected by an error burst, second delay line means for receiving said word from said channel, said second delay line means being characterized by N periods of delay and having a tap at each end thereof, means responsive to signals appearing at the $N-E$ taps of said first delay line means for indicating the presence of an end-connected error burst, and means responsive to signals appearing at the end taps of said second delay line means and to the absence of a signal on said channel for indicating the presence of an interior error burst.

References Cited in the file of this patent

Green et al.: "An Error Correcting Encoder and Decoder of High Efficiency," Proceedings of the I.R.E., October, 1958 (4 pages).